L. R. ROSEBROOK.
Running-Gears of Vehicles.
No. 141,463.  Patented August 5, 1873.
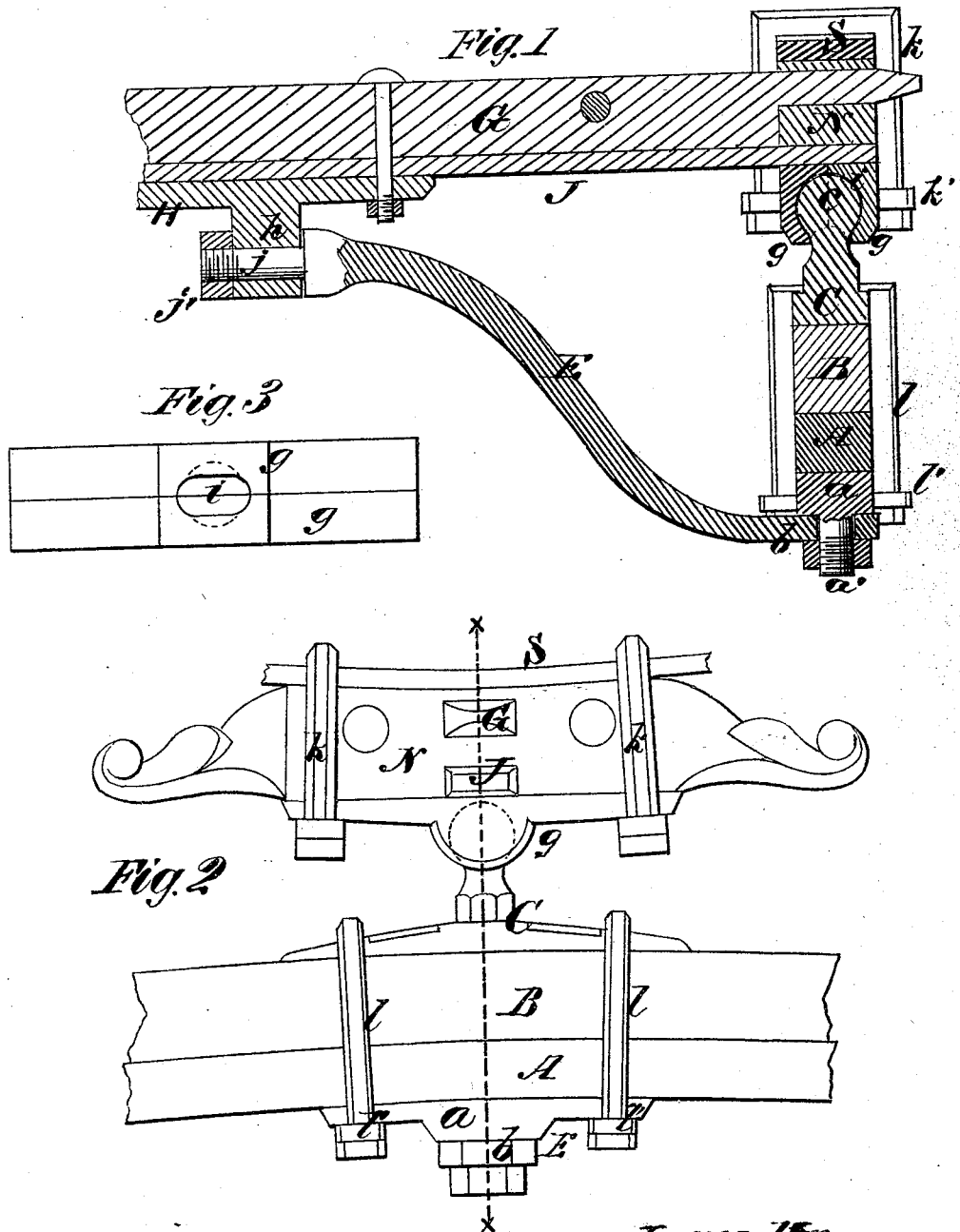
Witnesses:
R. T. Campbell
J. N. Campbell
Inventor
Lucius R. Rosebrook
by his Atty's
Mason Fenwick & Lawrence

UNITED STATES PATENT OFFICE.

LUCIUS R. ROSEBROOK, OF HARMON, ILLINOIS.

IMPROVEMENT IN RUNNING-GEARS OF VEHICLES.

Specification forming part of Letters Patent No. 141,463, dated August 5, 1873; application filed April 19, 1873.

*To all whom it may concern:*

Be it known that I, LUCIUS R. ROSEBROOK, of Harmon, in the county of Lee and State of Illinois, have invented a new Mode of Connecting the Head-Block of a Vehicle to the Axle; and I do hereby declare that the following is a full, clear, and exact description thereof, reference being had to the accompanying drawings making part of this specification, in which—

Figure 1 is a vertical section taken longitudinally and centrally through the improved head-block and axle connection. Fig. 2 is a front view. Fig. 3 is a bottom view of the socket-plates.

Similar letters of reference indicate corresponding parts in the several figures.

This invention relates to an improved mode of connecting the head-block of a vehicle to the axle thereof, whereby a free ball-and-socket movement is allowed and fifth-wheels and king-bolts dispensed with, as will be hereinafter explained.

The following description of my invention will enable others skilled in the art to understand it.

In the accompanying drawings, A represents the front axle of a vehicle, on which is confined the wooden stock B. On top of the stock B is secured a plate, C, having a ball, $c$, formed on it, and on the bottom of the axle a T-plate, $a$, is confined, having a vertical pivot-screw, $a'$, formed on it. The plates C and $a$ are rigidly confined in their respective places by means of clips $l$, clip-braces $l'$, and nuts, as clearly shown in Fig. 2. The ball $c$ is received into a socket, $i$, which is formed between two enlargements on plates $g$ $g$, which plates are rigidly confined to the bottom of the head-block N by means of clips $k$, clip-braces $k'$, and nuts, as shown in Fig. 2. The clips $k$ also confine the spring S on top of the head-block N. G represents the reach, and J its metallic portion, both of which are let into the head-block, as shown in Fig. 1, so that the metallic portion J impinges upon the socket-plates $g$ $g$. At a suitable distance in rear of the head-block N a plate, H, is rigidly bolted to the bottom of the reach G, on which plate an enlargement, $h$, is formed longitudinally, through which is an eye for the reception of a pivot-screw, $j$, on the rear end of a curved brace, E, on which screw is applied a nut, $j'$, shown in Fig. 1. The front end of the brace E is enlarged at $b$, and has an eye through it for receiving the vertical pivot-screw $a'$ on plate $a$. A nut on screw $a'$ holds the front end of the brace thereon.

It will be seen from the above description that the axle is allowed a free universal movement by the ball-and-socket joint, and that this joint connects the axle to the head-block, and is sustained by the double-jointed brace E.

I am aware that, broadly considered, a ball-and-socket joint combined with a jointed brace is not new for connecting an axle to a head-block; and this I do not claim.

The important feature of my invention is the socket-plates $g$, which are rigidly confined to the bottom of the head-block N by means of the same clips which secure the spring on top of the head-block. These plates $g$, when thus applied, greatly strengthen the wooden head-block, and afford a substantial and durable bearing for the ball which they receive.

Having described my invention, what I claim as new, and desire to secure by Letters Patent, is—

The double-jointed brace E, connected to an eye-piece, $h$, on the reach-plate, and to a pivot-screw, $a'$, on a plate, $a$, in combination with the ball $c$ and socket-plates $g$ $g$, substantially as described.

LUCIUS R. ROSEBROOK.

Witnesses:
C. K. SHELHAMER,
G. W. HILL.